S. SCHUYLER.

Grain Drier.

No. 1,434.

Reissued March 17, 1863.

Witnesses.

Geo. Coombs

L. W. Reed.

Inventor

S. Schuyler.

per Munn & Co

Attorneys

N. PETERS, Photo-Lithographer, Washington, D. C.

UNITED STATES PATENT OFFICE.

SAMUEL SCHUYLER, OF BROOKLYN, NEW YORK.

IMPROVEMENT IN GRAIN-DRIERS.

Specification forming part of Letters Patent No. 31,191, dated January 22, 1861; Reissue No. 1,434, dated March 17, 1863.

*To all whom it may concern:*

Be it known that I, SAMUEL SCHUYLER, of Brooklyn, in the county of Kings and State of New York, have invented certain new and useful Improvements in Apparatus for Drying Grain and other Substances; and I do hereby declare that the following is a full, clear, and exact description of the same, reference being had to the accompanying drawings, forming a part of this specification, in which—

Figure 1:
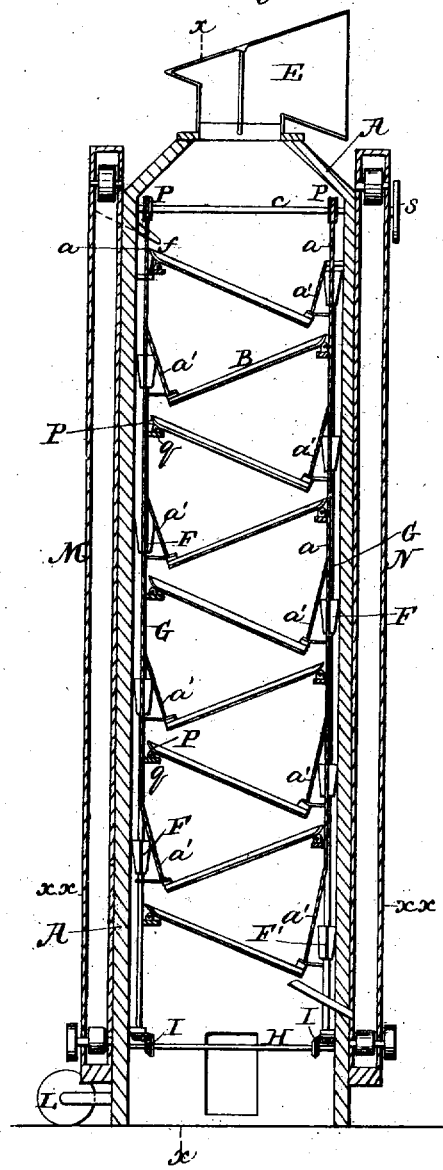
Figure 2:
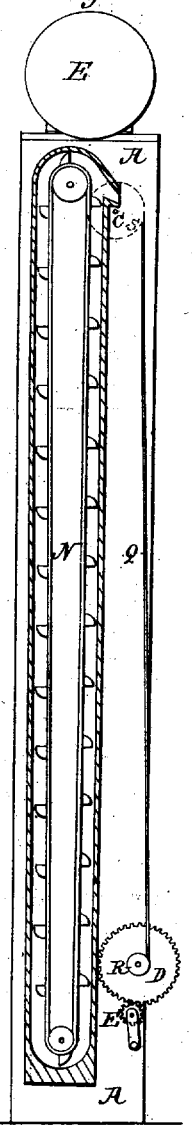
Figure 3:
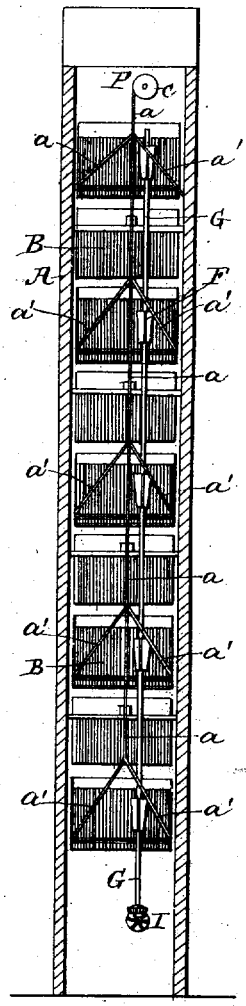
Figure 4:
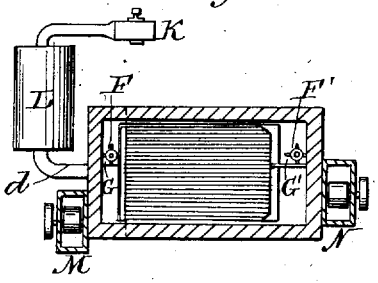

Figure 1 is a vertical section of an apparatus constructed according to my invention. Fig. 2 is an end elevation of the same with one of the elevators in section; Fig. 3, a vertical section at right angles to Fig. 1 in the lines *x x* of that figure. Fig. 4 is a horizontal section of the same in the lines *x x x x* of Fig. 1.

Similar letters of reference indicate corresponding parts in the several figures.

This invention relates to the employment within a tower or shaft, through which an upward circulation of air is produced, of a series of screens or grated or reticulated platforms arranged one above another at alternately opposite inclinations, and having a vibrating or shaking motion, so that the grain or other substances to be dried being deposited upon the uppermost screen or platform may pass down to the next below, and thence in succession from one to another of the whole series, while the air, circulating upward through and over the screens, absorbs and carries off the moisture with it through and to the top of the tower or shaft.

The improvements consist, first, in so combining the whole series of such screens or platforms with a suitable apparatus for raising and lowering one end of each, that the inclination of the several screens or platforms may be varied or adjusted simultaneously for the purpose of regulating the speed at which the grain or substance to be dried will descend the tower or shaft as the degree of its dampness may require; secondly, in the combination of such a series of screens or platforms and an elevating apparatus by which the grain or other substance to be dried is delivered onto the uppermost screen or platform of the series.

To enable those skilled in the art to make and use my invention, I will proceed to describe its construction and operation.

A is the tower or shaft, made of brick or other material, of such height as will afford sufficient time for the wet or damp grain or other moist substance in passing from the uppermost screen or platform successively over those below it to become properly dried when it reaches the bottom of the tower, the height for drying grain being about fifty feet.

B B are the screens or grated or reticulated platforms, having their openings of such size that the grain or other substance to be dried will not pass through them. These screens or platforms are severally hung at one end on a pivot, *p*, at the middle of their width, and at the other end are suspended at opposite corners by chains *a′ a′*, attached to two single chains, *a a*, which are capable of being wound on pulleys P P on a horizontal shaft, C, for the purpose of altering their angles of inclination, the said shaft C passing through the upper part of the tower, and being operated by means of spur-gears D E, Fig. 2, outside of the tower, and a cord or chain, Q, connected with a pulley, R, which is fast to the gear D, and a pulley, S, on the shaft C. The pivots *p p* are fitted to bearings in fixed bars *q q*, which extend all across the tower, and the said pivots permit the sieves or platforms to be vibrated sidewise in a similar manner to the "shoe" of a grist-mill for the purpose of shaking down the grain or other substance and distributing it over their upper surfaces by means of the damsels F F′ upon the two upright shafts G G′, which are operated by the horizontal shaft H and the bevel-gears I I′. The screens are attached to the pivots *p p* by hinge or knuckle joints. The inclination of the screens or platforms, which, as may be understood by reference to Fig. 1, is in opposite directions, may be about five inches to the foot for grain which is not very damp, and which requires the minimum amount of time for its passage from the top to the bottom of the shaft to be dried; but for grain which is more damp or wet the inclination of the several screens or platforms is easily lessened by raising their lower ends by winding up the chains *a a* on the pulleys P P, and the grain is then retained longer upon them, as it is shaken down and caused to fall over the lower end of one screen or platform onto the upper part of the next below it by their vibration produced by the damsels F F′. The pulleys P P and chains *a a* act upon all the screens alike, and hence, if all the screens are once set at corresponding inclinations, their inclinations will always correspond, however the adjustment may be varied.

K is a blower, by which air is blown through a heater, L, to be heated, and after being heated is forced through a pipe, D, into the tower A, for the purpose of passing upward through the screens or platforms B to dry the grain or other substance contained upon them. This air is carried off from the top of the tower by and through the ventilator or hood *c*, which turns on a pivot to keep its mouth turned away from the course of the wind.

M is an endless-chain elevator for raising the grain or other substance to be dried to the top of the tower, or shaft, to be deposited, through the spout *f*, upon the upper of the series of screens or platforms B. N is a similar elevator, to elevate the dried grain that has passed through the tower or shaft and off from the lower screen or platform up to the top of the tower, to be deposited in bins or other places for shipment or storage.

O is a door in the side of the tower or shaft, to permit a person to enter and examine, and, if necessary, repair the internal apparatus.

If required, the arrangement of platforms shown in the drawings may be made to operate as a kiln for kiln-drying grain, for the purpose of using it for making malt liquors, by elevating the platforms to or nearly to a level, and introducing at the bottom of the tower or shaft a highly-heated current of air, and then, after the contents of the several platforms have been properly heated and dried, depressing the ends which are suspended by the chains sufficiently to empty the lowest platform and to pass the contents of each of the upper ones onto that beneath it.

In case the grain or substance to be dried is very wet, a pipe from the heater L may be carried up on the outside of the tower or shaft A, to throw under the upper screens or platforms a current of heated air to act upon the grain or substance on those platforms with greater effect, for drying purposes.

The advantages of this invention are that a given quantity of damp or wet grain or other substance may be dried by its use in less time and at less expense than by any arrangement at present used for the purpose, and that the apparatus can be constructed at less expense and to occupy less room than any other now used or known.

What I claim as my invention, and desire to secure by Letters Patent, is—

1. So combining the several screens or platforms B B, by means of chains and pulleys, or other equivalent devices, for adjusting their elevation, that all may be simultaneously raised or lowered at one end for the purpose of adjusting or varying their inclinations, substantially as and for the purpose herein specified.

2. The combination of the series of platforms B B with the elevator M, or its equivalent, substantially as and for the purpose herein set forth.

SAML. SCHUYLER.

Witnesses:
ALFRED HALL,
JAS. W. HALE.